(12) United States Patent
Gomi et al.

(10) Patent No.: US 8,369,624 B2
(45) Date of Patent: Feb. 5, 2013

(54) IMAGE PROCESSING APPARATUS, IMAGE PROCESSING METHOD, PROGRAM OF IMAGE PROCESSING METHOD, AND RECORDING MEDIUM HAVING PROGRAM OF IMAGE PROCESSING METHOD RECORDED THEREON

(75) Inventors: Shinichiro Gomi, Chiba (JP); Masami Ogata, Kanagawa (JP)

(73) Assignee: Sony Corporation, Tokyo (JP)

( * ) Notice: Subject to any disclaimer, the term of this patent is extended or adjusted under 35 U.S.C. 154(b) by 474 days.

(21) Appl. No.: 12/376,983

(22) PCT Filed: Apr. 21, 2008

(86) PCT No.: PCT/JP2008/057682
§ 371 (c)(1),
(2), (4) Date: Mar. 17, 2010

(87) PCT Pub. No.: WO2008/152861
PCT Pub. Date: Dec. 18, 2008

(65) Prior Publication Data
US 2010/0189359 A1 Jul. 29, 2010

(30) Foreign Application Priority Data
Jun. 15, 2007 (JP) .................. P2007-158547

(51) Int. Cl.
*G06K 9/48* (2006.01)
(52) U.S. Cl. ......... 382/199; 382/190; 382/284; 382/274
(58) Field of Classification Search ............... 382/190, 382/199, 284, 274
See application file for complete search history.

(56) References Cited

U.S. PATENT DOCUMENTS
5,930,402 A * 7/1999 Kim .............................. 382/274

FOREIGN PATENT DOCUMENTS
JP 08-56316 2/1996
JP 2004-266757 * 9/2004

OTHER PUBLICATIONS
Harada, the English version of the Abstract of JP2004-266757, 2004.*

* cited by examiner

*Primary Examiner* — Matthew Bella
*Assistant Examiner* — Ruiping Li
(74) *Attorney, Agent, or Firm* — Finnegan, Henderson, Farabow, Garrett & Dunner, L.L.P.

(57) ABSTRACT

The present invention relates to an image processing apparatus, an image processing method, a program of the image processing method, and a recording medium having the program of the image processing method recorded thereon, and the present invention is applied to, for example, a display apparatus and improves the textures of details compared with the past.

The present invention extracts a texture component S4 from an input image S1, reduces the texture component S4 to generate a subtle texture component S3, and performs image combination of this subtle texture component S3 and the input image S1.

23 Claims, 12 Drawing Sheets

FIG. 5

| | | |
|---|---|---|
| | | |
| | S (i, j) | S (i + 1, j) |
| S (i - 1, j + 1) | S (i, j + 1) | S (i + 1, j + 1) |

FIG. 6

| ul | uc | ur |
|----|----|----|
| l  | c  | r  |
| bl | bc | br |

IMAGE PROCESSING APPARATUS, IMAGE PROCESSING METHOD, PROGRAM OF IMAGE PROCESSING METHOD, AND RECORDING MEDIUM HAVING PROGRAM OF IMAGE PROCESSING METHOD RECORDED THEREON

TECHNICAL FIELD

The present invention relates to an image processing apparatus, an image processing method, a program of the image processing method, and a recording medium having the program of the image processing method recorded thereon, and is applicable to, for example, a display apparatus. The present invention improves the textures of details, compared with the past, by extracting a texture component from an input image, reducing the texture component to generate a subtle texture component, and performing image combination of this subtle texture component and the input image.

BACKGROUND ART

Hitherto, various methods of improving the image quality by enhancing a high frequency component, an edge component, or the like included in a luminance signal have been proposed in various video image apparatuses, such as display apparatuses. For example, a method of preventing an increase in noise and enhancing contrast is proposed in Japanese Unexamined Patent Application Publication No. 8-56316.

However, in these conventional techniques, there is a problem that the textures of details, such as grasses, flowers, the leaves of trees, and the surface of rocks, cannot be improved, although the vividness or the like of a display image can be increased.

In particular, when a video signal based on the SDTV (Standard Definition Television) system is format-converted to a video signal based on the HDTV (High Definition Television) system by performing scaling, the textures of these details, such as grasses, flowers, the leaves of trees, and the surface of rocks, are lost. There is a problem with the conventional techniques that the textures of these details cannot be improved.

Patent Citation 1: Japanese Unexamined Patent Application Publication No. 8-56316

DISCLOSURE OF INVENTION

Technical Problem

The present invention has been made in view of the foregoing points and provides an image processing apparatus, an image processing method, a program of the image processing method, and a recording medium having the program of the image processing method recorded thereon which are capable of improving the textures of details.

Technical Solution

In order to solve the above-described problems, the invention of Claim 1 is applied to an image processing apparatus including a texture extraction unit that extracts a texture component from an input image; a subtle texture generation unit that generates, for each of blocks formed by dividing the input image, a basic block by reducing a block constituted of the texture component and repeatedly arranges the basic block in the block, thereby generating a subtle texture component in which a spatial frequency of the texture component has been increased; a blending unit that performs image combination of the subtle texture component and the input image; and a texture-added-amount control unit that sets an image combining ratio in the blending unit.

Further, the invention of Claim 2 is applied to an image processing method including a texture extraction step of extracting a texture component from an input image; a subtle texture generation step of generating, for each of blocks formed by dividing the input image, a basic block by reducing a block constituted of the texture component and repeatedly arranging the basic block in the block, thereby generating a subtle texture component in which a spatial frequency of the texture component has been increased; a blending step of performing image combination of the subtle texture component and the input image to generate an output image; and a texture-added-amount control step of setting an image combining ratio in the blending step.

Further, the invention of Claim 13 is applied to a program of an image processing method, including a texture extraction step of extracting a texture component from an input image; a subtle texture generation step of generating, for each of blocks formed by dividing the input image, a basic block by reducing a block constituted of the texture component and repeatedly arranging the basic block in the block, thereby generating a subtle texture component in which a spatial frequency of the texture component has been increased; a blending step of performing image combination of the subtle texture component and the input image to generate an output image; and a texture-added-amount control step of setting an image combining ratio in the blending step.

Further, the invention of Claim 14 is applied to a recording medium having a program of an image processing method recorded thereon. The program includes a texture extraction step of extracting a texture component from an input image; a subtle texture generation step of generating, for each of blocks formed by dividing the input image, a basic block by reducing a block constituted of the texture component and repeatedly arranging the basic block in the block, thereby generating a subtle texture component in which a spatial frequency of the texture component has been increased; a blending step of performing image combination of the subtle texture component and the input image to generate an output image; and a texture-added-amount control step of setting an image combining ratio in the blending step.

With the structure of Claim 1, Claim 2, Claim 13, or Claim 14, a basic block is generated by reducing a block constituted of a texture component extracted from an input image. This basic block is repeatedly arranged in the original block to generate a subtle texture component. Image combination is performed on this subtle texture component and the input image to generate an output image. This can increase a spatial frequency due to the texture component and improve the texture of a detail. Also, with the setting of an image combining ratio, an inconvenient process in an edge or the like can be avoided.

ADVANTAGEOUS EFFECTS

According to the present invention, the textures of details can be improved.

BRIEF DESCRIPTION OF DRAWINGS

FIG. 5 is a schematic diagram provided to describe the operation of the difference diffusion unit in FIG. 2.

FIG. 6 is a schematic diagram provided to describe a peak suppression unit in FIG. 1.

EXPLANATION OF REFERENCE

1: video signal processing apparatus, 2: texture generation unit, 3: texture extraction unit, 4, 21: low-pass filter, 5, 12, 22: subtraction circuit, 6: subtle texture generation unit, 7, 27, 28, 31: tiling unit, 8: unevenness reducing unit, 9: difference diffusion unit, 10: subtraction unit, 11: error filter, 15: texture combining unit, 16: texture-added-amount control unit, 17: blending unit, 18: peak detection unit, 19: peak suppression unit, 20: fluctuating gain calculation unit, 23: gain setting unit, 25: gradient analysis unit, 26: degree-of-texture calculation unit, 29: edge analysis unit, 30: activity calculation unit, 32: activity analysis unit, 33: activity-ratio calculation unit, 34: activity-ratio analysis unit, 35: multiplication circuit

BEST MODES FOR CARRYING OUT THE INVENTION

Figure 1:
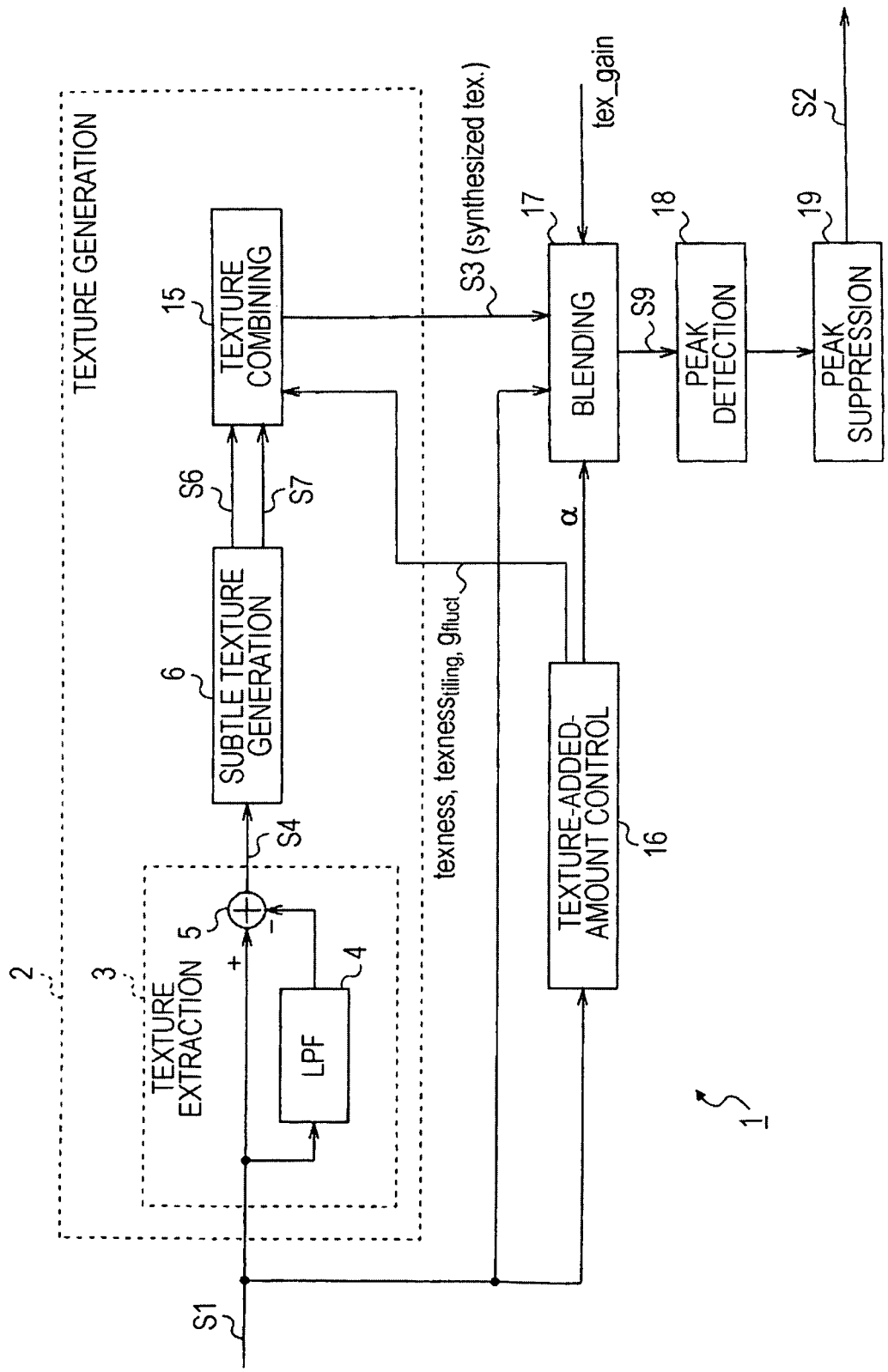
FIG. 1 is a block diagram showing a video signal processing apparatus of an embodiment of the present invention.

Hereinafter, embodiments of the present invention will be described in detail with reference to the drawings as needed.
Embodiment 1
(1) Structure of Embodiment FIG. 1 is a block diagram showing an image processing apparatus of an embodiment 1 of the present invention. This video signal processing apparatus 1 is contained in various video image apparatuses, such as a display apparatus, improves the image quality of an input image based on an input video signal S1, and outputs an output video signal S2. Note that, hereinafter, it is described that there is 1 processing channel with this video signal processing apparatus 1, and only a luminance signal of the input video signal S1 is to be processed by this video signal processing apparatus 1. However, the processing with this image processing apparatus may involve 3 processing channels, and the processing of a luminance signal and chrominance signals may be executed on the individual channels. Alternatively, the processing of individual color signals constituting primary-color color signals and complementary-color color signals may be executed on the individual channels.

Here, in this embodiment, the video signal processing apparatus 1 is configured with a processor that processes the input video signal S1 by executing a predetermined program. In this embodiment, this program is provided by installing it in advance. However, instead of this, the program may be provided by recording it onto a recording medium, such as an optical disk, a magnetic disk, or a memory card, or the program may be provided by downloading it via a network, such as the Internet. Alternatively, the video signal processing apparatus 1 may be configured with hardware.

This video signal processing apparatus 1 extracts, from the input video signal S1, a detailed structure component in a uniform portion of a background, a foreground, or the like, such as grasses, flowers, the leaves of trees, or the surface of rocks (hereinafter referred to as a texture component). The video signal processing apparatus 1 reduces this extracted texture component to generate a subtle texture component S3 with a higher spatial frequency. Further, the video signal processing apparatus 1 performs image combination so as to paste this subtle texture component S3 to the original input video signal S1, thereby improving the texture of a detail of the input video signal S1 and outputting an output image based on an output video signal S2. Note that, in here, the texture component which is this detailed structure component is a relative component with respect to a large-scale structure signal component that characterizes each portion of the video image. Accordingly, the frequency band becomes different according to the input video signal to be processed and further in each portion of the video image based on the input video signal. However, in this embodiment, a texture component is extracted from the input video signal by extracting a high frequency component from the input video signal using a filter having fixed characteristics.

Therefore, in the video signal processing apparatus 1, a texture generation unit 2 extracts a texture component by extracting a high frequency component from the input video signal S1 and generates a subtle texture component S3 by reducing this extracted texture component. That is, in the texture generation unit 2, a texture extraction unit 3 inputs the input video signal S1 into a two-dimensional low-pass filter (LPF) 4 to extract, therein, a low frequency component from the input video signal S1. The texture extraction unit 3 subtracts, with a subtraction circuit 5, this low frequency component from the input video signal S1 to extract a texture component S4 from the input video signal S1.

Figure 2:
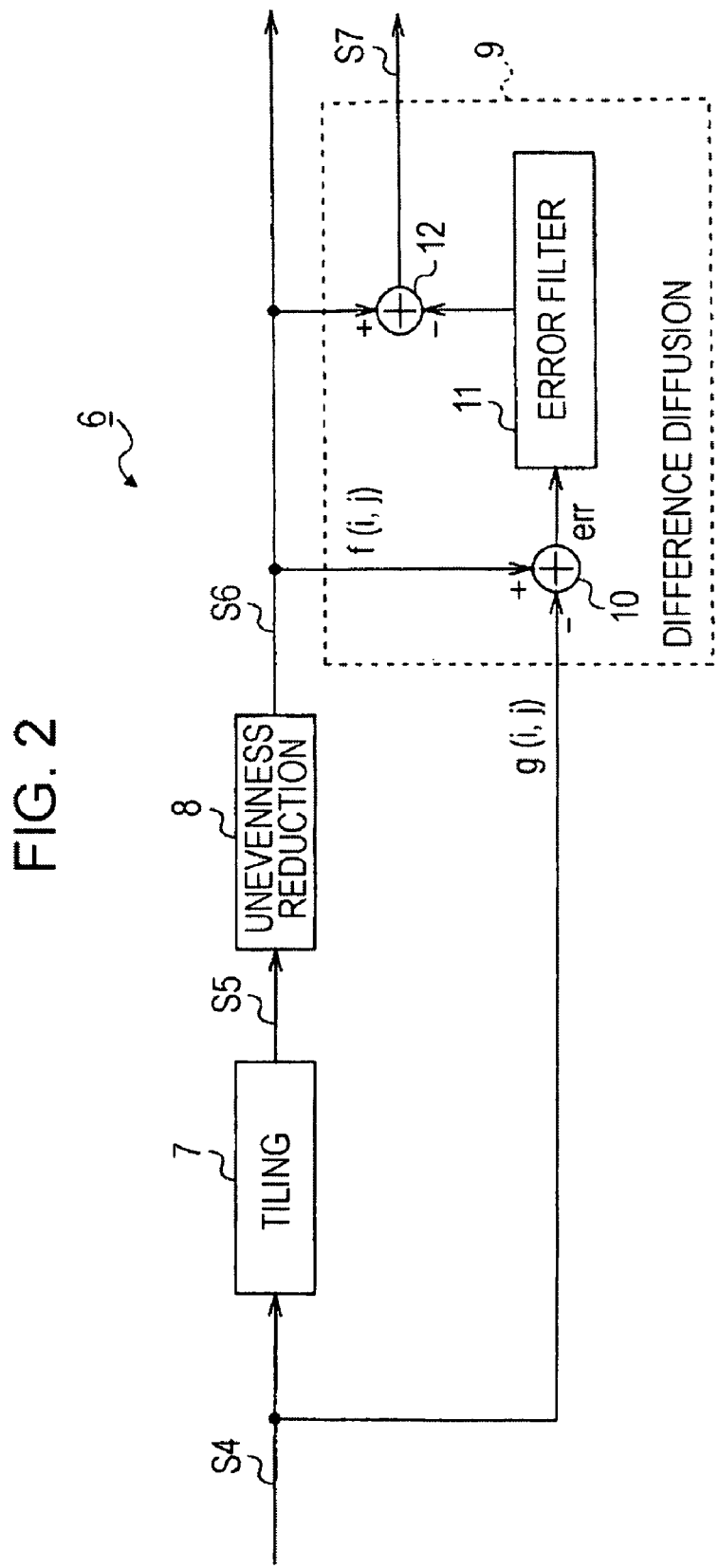
FIG. 2 is a block diagram showing a subtle texture generation unit in FIG. 1.

A subtle texture generation unit 6 reduces this texture component S4 to generate a subtle texture component. That is, as shown in FIG. 2, in the subtle texture generation unit 6, a tiling unit 7 reduces, for each of blocks formed by dividing an input image, the texture component of each block to form a basic block. Further, this basic block is rearranged in the original block, thereby reducing the texture component S4 to generate a subtle texture component S5.

More specifically, the tiling unit 7 sets, for example, as shown in FIG. 3(A), a block BL having 8×2 pixels in a horizontal direction and 8×2 pixels in a vertical direction for the texture component S4. Note that the number of pixels constituting 1 block BL can be variously set according to need. Also, the foregoing is not limited to the case where the input image is equally divided. For example, the dividing size may be changed according to the degree of evenness of the input video signal S1 or the like. Note that, in such a case where the dividing size is changed according to the degree of evenness, for example, the more even a portion is, the larger the block size. Also, when processing is performed with 3 channels of a luminance signal and chrominance signals or the like, the position of the block BL may be shifted on a channel-by-channel basis so that the boundary does not overlap the block BL in each channel.

The tiling unit 7 cuts out, for each block BL, a central portion BLA of the block BL and, as shown in FIG. 3(B), reduces this cut-out portion BLA by performing scaling to form a basic block BBL. In accordance with the degree of evenness of the input video signal S1 or the degree of evenness of the texture component S4, the tiling unit 7 changes the size of this cut-out portion BLA, thereby improving the image quality. Specifically, the higher the degree of evenness, the larger the cut-out portion BLA. Note that, in this example in FIG. 3(B), a central portion of the 16-pixel×16-pixel block BL, a portion BLA having 8×n/d pixels in the horizontal direction and in the vertical direction, is cut out. This cut-out portion BLA is scaled to generate an 8-pixel×8-pixel basic block BBL.

The tiling unit 7 rearranges, as shown in FIG. 3(C), this basic block BBL in the corresponding original block BL, thereby generating a subtle texture component S5.

An unevenness reducing unit 8 (FIG. 2) reduces unevenness between basic blocks BBL of subtle texture components S5 and outputs subtle texture components S6. Here, as indicated by hatching in FIG. 3(D), the unevenness reducing unit 8 executes a filtering process based on the characteristics of a low-pass filter only on a pixel adjacent to the boundary of the basic block BBL, thereby reducing deterioration of a high frequency component as much as possible and reducing unevenness in the block boundary. Note that, specifically, a filtering process is executed using a vertical-directional low-pass filter whose tap coefficients are 1, 2, and 1 on pixels only adjacent to the boundary extending in the horizontal direction, which is indicated by reference G1. Also, a filtering process is executed using a horizontal-directional low-pass filter whose Lap coefficients are 1, 2, and 1 on pixels only adjacent to the boundary extending in the vertical direction, which is indicated by reference G2. Also, a filtering process is executed using a horizontal-directional and vertical-directional low-pass filter whose tap coefficients are 1, 2, and 1 on pixels adjacent to the boundary extending in the vertical direction and in the horizontal direction, which is indicated by reference G3.

A difference diffusion unit 9 diffuses a difference value between the subtle texture component S6 output from this unevenness reducing unit 8 and the original texture component S4 into peripheral pixels, thereby generating a subtle texture component S7. That is, in the difference diffusion unit 9, a subtraction unit 10 subtracts the original texture component S4 from the subtle texture component S6 output from the unevenness reducing unit 8, thereby calculating a difference err indicated by the following equation. Note that, in here, g(i, j) is the value of the texture component S4 of a target pixel at the position (i, j), and f (i, j) is the value of the subtle texture component S6 output from the unevenness reducing unit 8:

[Eq. 1]

$$\mathrm{err}=f(i,j)-g(i,j) \quad (1)$$

Figure 4:
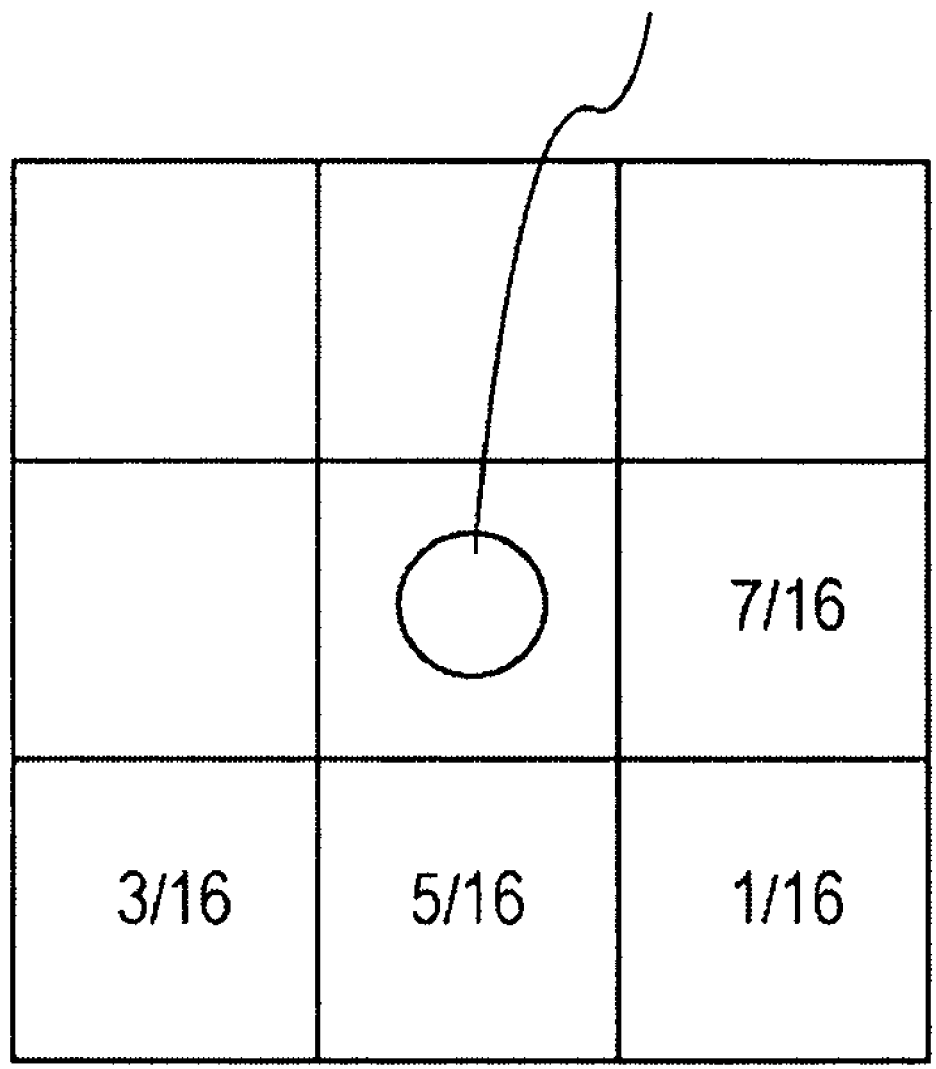
FIG. 4 is a schematic diagram showing an error filter in a difference diffusion unit in FIG. 2.

The difference diffusion unit 9 inputs this difference err into an error filter 11 of Floyd & Steinberg, which has characteristics shown in FIG. 4. In a subtraction circuit 12, an output of this error filter 11 is subtracted from the subtle texture component S6 output from the unevenness reducing unit 8. Accordingly, the difference diffusion unit 9 diffuses the difference err into peripheral pixels, as indicated by the following equations. Note that this filter for diffusing the difference value is not limited to the Floyd & Steinberg filter, and various filters are applicable.

[Eq. 2]

$$f(i+1,j)=f(i+1,j)-7/16\times\mathrm{err}$$

$$f(i-1,j+1)=f(i-1,j+1)-3/16\times\mathrm{err}$$

$$f(i,j+1)=f(i,j+1)-5/16\times\mathrm{err}$$

$$f(i+1,j+1)=f(i+1,j+1)-1/16\times\mathrm{err} \quad (2)$$

Figure 5:
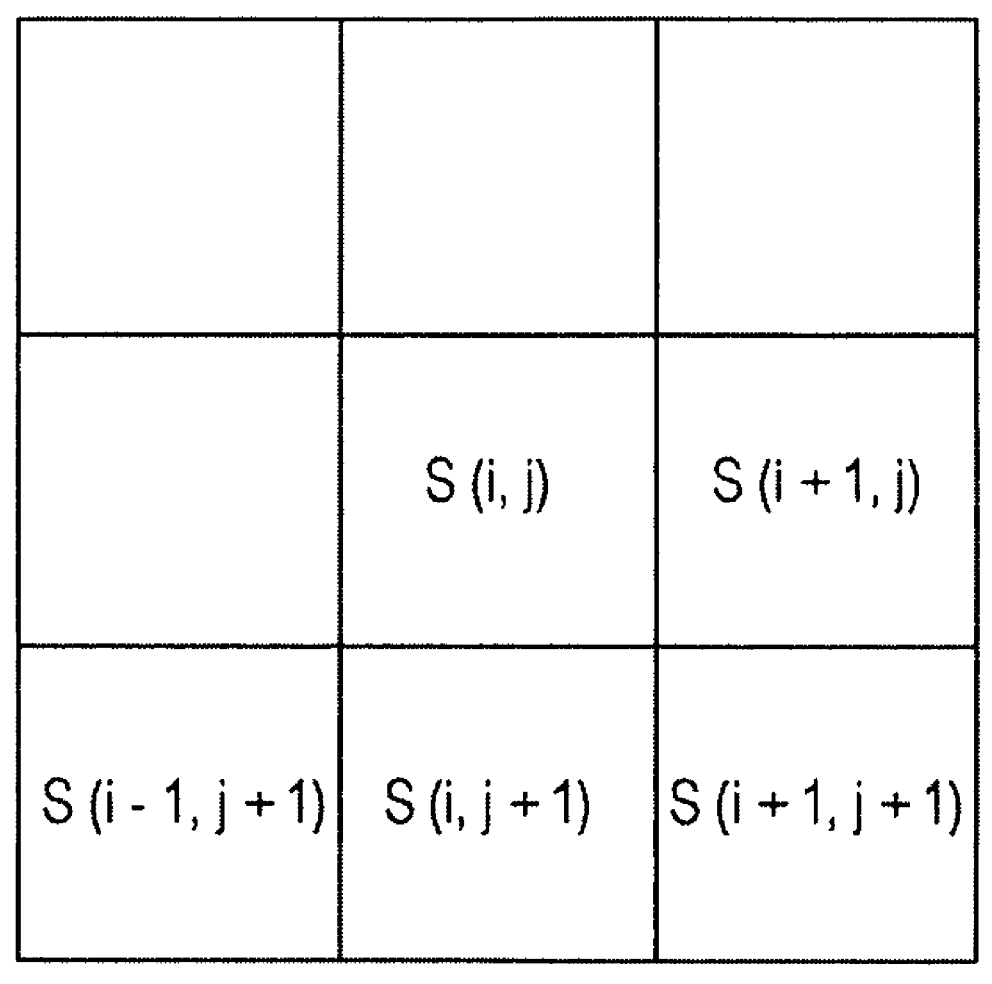

Note that, in here, f(i+1, j), f(i−1, j+1), f(i, j+1), and f(i+1, j+1) in the left members are subtle texture component values of adjacent pixels after difference diffusion of the difference err of the target pixel at the position (j, j) has been performed, and f(i+1, j), f(i−1, j+1), f(i, j+1), and f(i+1, j+1) in the right members are subtle texture component values of the adjacent pixels before the difference diffusion has been performed. Further, the relationship between this target pixel and the adjacent pixels is shown in FIG. 5.

The subtle texture generation unit 6 outputs the subtle texture component S6, which is output from the unevenness reducing unit 8 and which is before the error diffusion processing, and the subtle texture component S7, which is output from the subtraction circuit 12 and which has been error-diffusion-processed, to a texture combining unit 15 (FIG. 1).

The texture combining unit 15 executes arithmetic processing of the following equations using degrees of texture texness and texness$_{tiling}$ and a fluctuating gain $g_{fluct}$ output from a texture-added-amount control unit 16, thereby combining the subtle texture components S6 and S7 to generate a subtle texture component S3. Here, $\mathrm{Tex}_{no\_err\_diff}$ is the value of the subtle texture component S6 which is before the error diffusion processing, and $\mathrm{Tex}_{err\_diff}$ is the value of the subtle texture component S7 which has been error-diffusion processed. Also, the degrees of texture texness and texness$_{tiling}$ are parameters that indicate the probability of the subtle texture components S6 and S7 being texture components, respectively. Also, the fluctuating gain $g_{fluct}$ is gain for preventing unnaturalness due to a sequence of basic blocks. In this embodiment, the fluctuating gain $g_{fluct}$ is generated according to the amount of a high frequency component of the input video signal S1. Also, min(A, B) is a function for selecting a smaller value from A and B.

[Eq. 3]

$$\text{synthesized tex.}=g_{fluct}\times(\beta\times\mathrm{Tex.}_{no\_err\_diff}+(1-\beta)\times\mathrm{Tex.}_{err\_diff})\ \beta=\min(\text{texness},\text{texness}_{tiling}) \quad (3)$$

Accordingly, the texture combining unit 15 complementarily changes the component amount of the subtle texture component S6 which has not been error-diffused and the component amount of the subtle texture component S7 which has been error-diffused, combines these subtle texture components S6 and S7, and outputs the subtle texture component S3 (synthesized tex.) based on the subtle texture components S6 and S7 which have been processed more appropriately. Specifically, the texture combining unit 15 increases the component amount of the subtle texture component S6 which has not been error-diffused in a detailed structure portion, such as grasses, flowers, the leaves of trees, or the surface of rocks, and increases the component amount of the subtle texture component S7 which has been error-diffused in the boundary between various subjects or an edge.

A blending unit 17 executes arithmetic processing of the following equation using a gain tex gain and a blend ratio α which is output from the texture-added-amount control unit 16 to combine the subtle texture component S3 (texure) and the input video signal S1 (in) so as to paste the subtle texture component S3 output from the texture generation unit 2 to the input video signal S1, and outputs a video signal S9 (out). Note that, in here, the gain tex gain is a parameter that specifies the degree of processing in this video signal processing apparatus 1. In this embodiment, the gain tex gain is input by a user operation. However, the gain tex gain may be automatically set according to, for example, the attribute of the input video signal S1, such as an animated cartoon or a film, according to whether the original source of the input video signal S1 is based on SDTV or HDTV, or further depending on the analysis of the input video signal S1, such as the degree of evenness.

[Eq. 4]

$$\text{out} = \text{in} + \text{tex\_gain} \times \alpha \times \text{texture} \quad (4)$$

Figure 6:
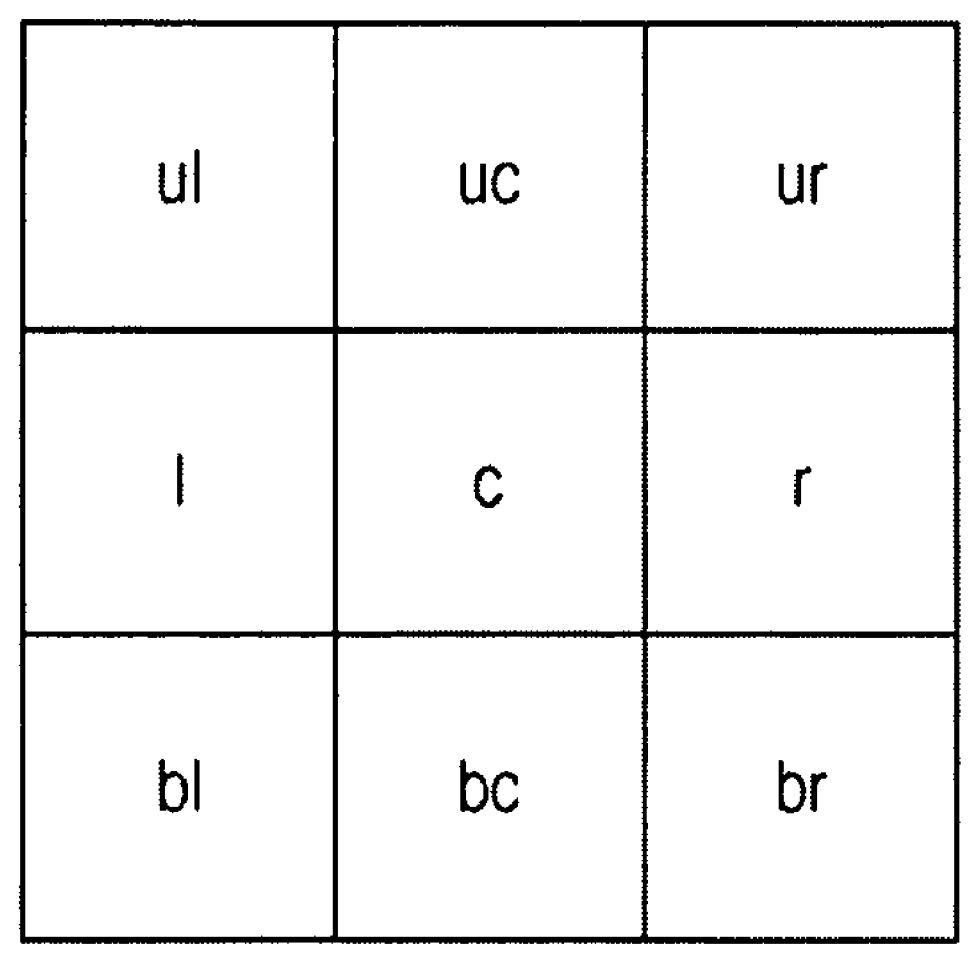

A peak detection unit 18 receives the video signal S9 output from the blending unit 17 and detects the rising amount of a luminance level from adjacent pixels. That is, as shown in FIG. 6, the peak detection unit 18 detects a pixel having the highest luminance value from among peripheral pixels ul to ur, l, r, and bl to br, subtracts the luminance value of the detected pixel from the luminance value of a target pixel C, and outputs a difference value.

A peak suppression unit 19 determines the difference value detected by the peak detection unit 18 using a predetermined threshold value and detects a target pixel whose luminance value rises suddenly compared with peripheral pixels. The peak suppression unit 19 applies a two-dimensional low-pass filter to this target pixel whose luminance value rises suddenly compared with the peripheral pixels, thereby causing the luminance value to fall. Accordingly, a luminance value that has risen locally is suppressed on a pixel-by-pixel basis, and the output video signal S2 is output. Note that, for this suppression of a luminance value that has risen locally, various techniques, such as replacing the luminance value with the pixel value of a certain peripheral pixel, can be applied.

Figure 7:
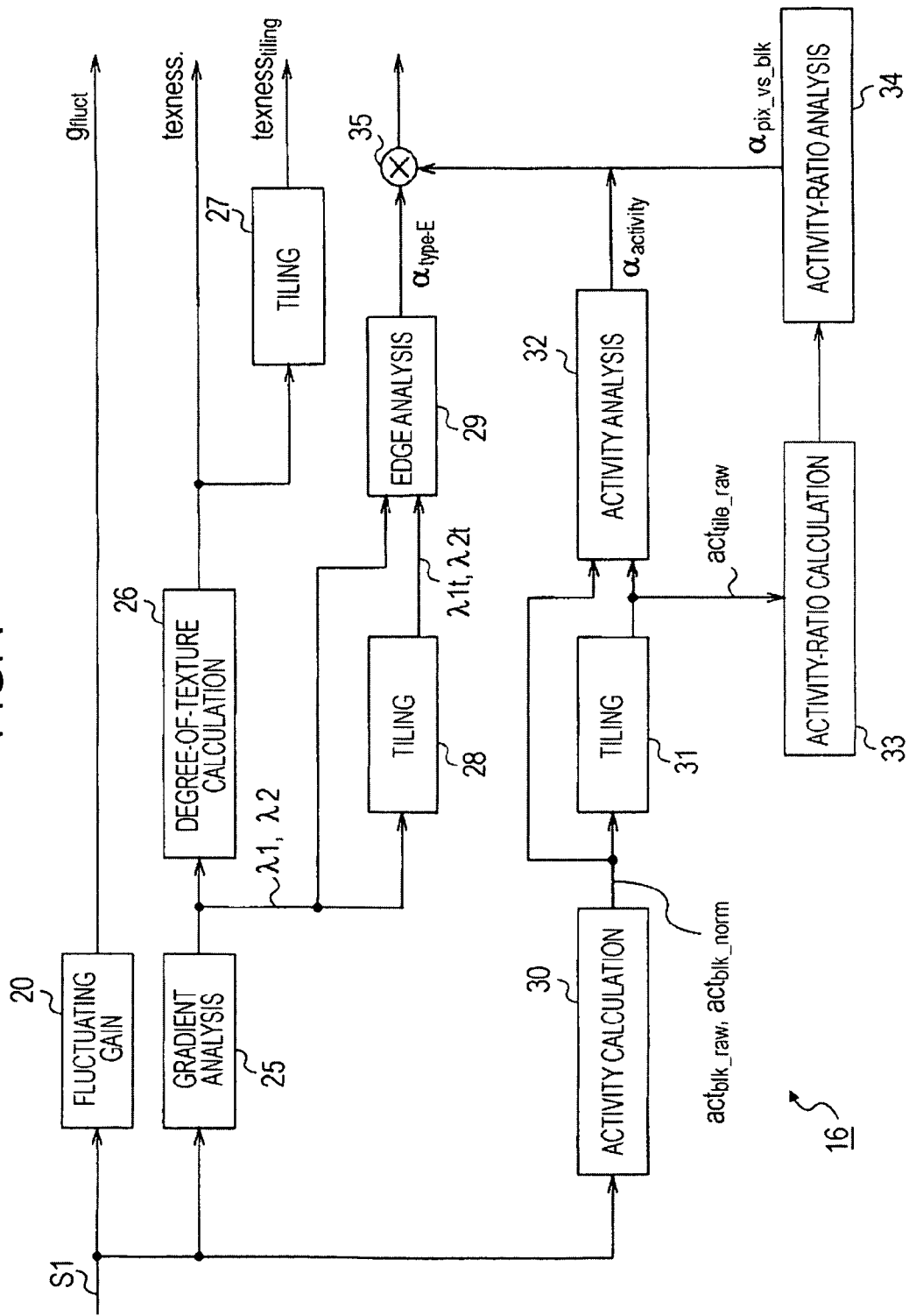
FIG. 7 is a block diagram showing a texture-added-amount control unit in FIG. 1.
Figure 8:
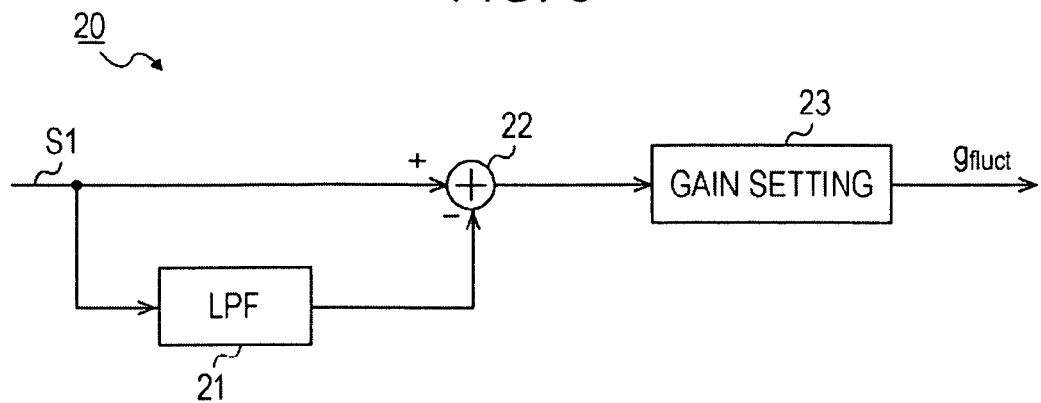
FIG. 8 is a block diagram showing a fluctuating gain calculation unit in FIG. 7.

By processing the input video signal S1, the texture-added-amount control unit 16 calculates and outputs the degrees of texture texness and texness$_{tiling}$, the fluctuating gain $g_{fluct}$, and the blend ratio $\alpha$. That is, as shown in FIG. 7, in the texture-added-amount control unit 16, a fluctuating gain calculation unit 20 processes the input video signal S1 and outputs the fluctuating gain $g_{fluct}$. Here, as shown in FIG. 8, the fluctuating gain calculation unit 20 inputs the input video signal S1 into a low-pass filter (LPF) 21 to extract a low frequency component. In the subtraction circuit 22, this low frequency component is subtracted from the input video signal S1 to detect a high frequency component of the input video signal S1.

Figure 9:
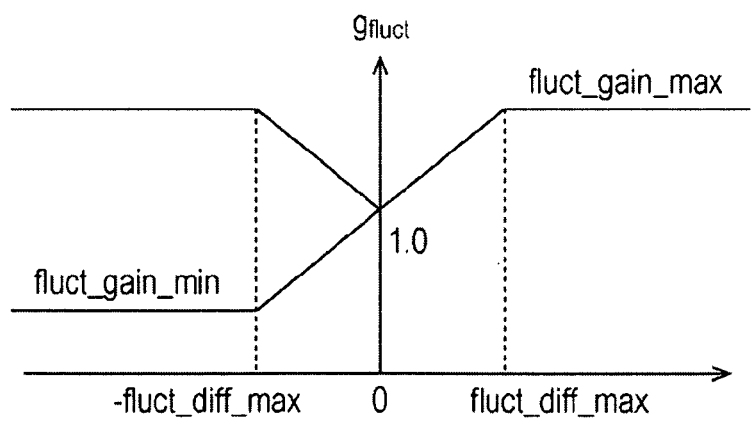
FIG. 9 is a characteristic curve diagram provided to describe the operation of the fluctuating gain calculation unit in FIG. 8.

A gain setting unit 23 determines the signal level of this high frequency component. As shown in FIG. 9, the gain setting unit 23 sets the fluctuating gain $g_{fluct}$ so that, when the signal level of the input video signal S1 relative to an output value of the low-pass filter 21 is within the range between a maximum value fluct diff max and a minimum value −fluct diff min, the gain increases in proportion to the output value of the subtraction circuit 22 and, when the signal level of the input video signal S1 is outside the range between this maximum value fluct diff max and this minimum value −fluct diff min, the gain becomes the maximum value fluct diff max and the minimum value −fluct diff min, respectively. Note that, in short, the fluctuating gain $g_{fluct}$ subtly changes pixel values so that changes in pixel values in a sequence of basic blocks become closer to changes in pixel values in a natural image.

Therefore, the fluctuating gain $g_{fluct}$ is not limited to be generated on the basis of the characteristics shown in FIG. 9, and the fluctuating gain $g_{fluct}$ can be variously generated according to the amount of a high frequency component of the input video signal S1, the signal level of the input video signal S1, or the like. For example, as indicated by broken lines in FIG. 9, the fluctuating gain $g_{fluct}$ may be set on the basis of characteristics shifting back and forth between the maximum value fluct diff max and the minimum value −fluct diff min.

A gradient analysis unit 25 processes the input video signal S1 to calculate eigenvalues $\lambda 1$ and $\lambda 2$ of a luminance gradient matrix, thereby detecting a parameter indicating the edgeness of the target pixel. That is, the gradient analysis unit 25 detects, for each of pixels of the input video signal S1, an edge gradient direction in which the gradient of the pixel value is largest and an edge direction perpendicular to this edge gradient direction.

Figure 10:
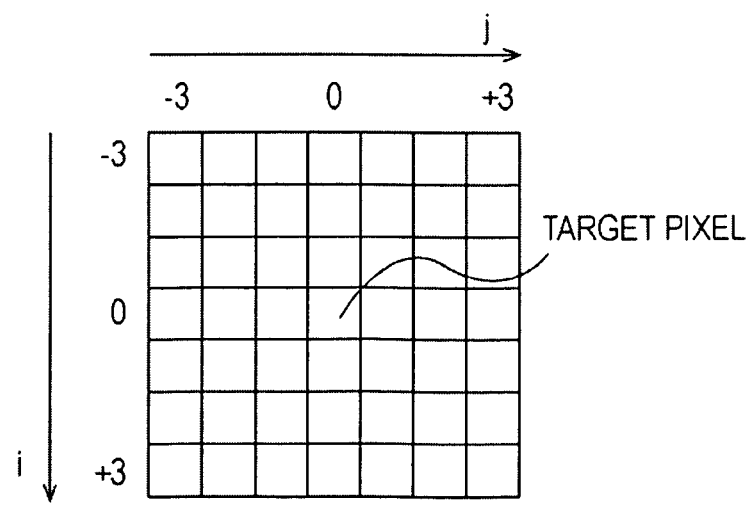
FIG. 10 is a schematic diagram provided to describe the operation of a gradient analysis unit in FIG. 7.

Here, as shown in FIG. 10, the gradient analysis unit 25 performs arithmetic processing using pixel values within a range W surrounding a target pixel, thereby generating a luminance gradient matrix G represented by the following equation on a pixel-by-pixel basis. Note that, in here, FIG. 10 corresponds to the example where ±3 pixels in the x-direction and the y-direction surrounding the target pixel are set in this range W.

[Eq. 5]

$$G = \int_w g^T g w dA \quad (5)$$
$$= \sum_w \begin{pmatrix} g_x^{(i,j)} g_x^{(i,j)} w^{(i,j)} & g_x^{(i,j)} g_y^{(i,j)} w^{(i,j)} \\ g_x^{(i,j)} g_y^{(i,j)} w^{(i,j)} & g_y^{(i,j)} g_y^{(i,j)} w^{(i,j)} \end{pmatrix}$$
$$\equiv \begin{pmatrix} G_{xx} & G_{xy} \\ G_{xy} & G_{yy} \end{pmatrix}$$

Note that, in here, $w^{(i,j)}$ is a Gaussian weight represented by (6) Equation, and g is a luminance gradient represented by (7) Equation using a partial differential gx in the x-direction of an image luminance I and a partial differential gy in the y-direction of the image luminance I:

[Eq. 6]

$$w^{(i,j)} = \exp\left(-\frac{i^2 + j^2}{2\sigma^2}\right) \quad (6)$$

[Eq. 7]

$$g = (g_x, g_y) \quad (7)$$
$$= \left(\frac{\partial I}{\partial x}, \frac{\partial I}{\partial y}\right)$$

Accordingly, the gradient analysis unit 25 detects a luminance gradient by performing a weighting process for the predetermined range w surrounding the target pixel with reference to the target pixel.

Figure 11:
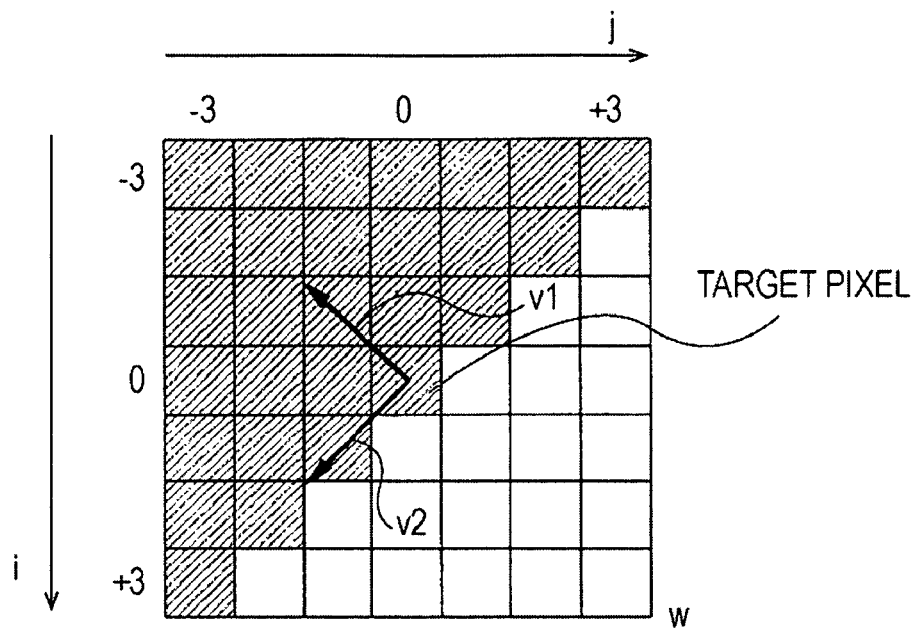
FIG. 11 is a schematic diagram provided to give a description continued from FIG. 10.

By processing the luminance gradient matrix G, as shown in FIG. 11, the gradient analysis unit 25 detects the eigenvalues $\lambda 1$ and $\lambda 2$ indicating diffusion of the gradient of the pixel value in an edge gradient direction v1 which is a direction in which the gradient of the pixel value is largest and in an edge direction v2 which is a direction perpendicular to this edge gradient direction v1, respectively.

Specifically, the gradient analysis unit 25 detects the eigenvalues λ1 and λ2 (λ1≧λ2) by performing arithmetic processing of the following equations:

[Eq. 8]
$$\lambda 1 = \frac{G_{xx} + G_{yy} + \sqrt{a}}{2} \quad (8)$$

[Eq. 9]
$$\lambda 2 = \frac{G_{xx} + G_{yy} - \sqrt{a}}{2} \quad (9)$$

Note that a is based on the following equation:
[Eq. 10]
$$a = G_{xx}^2 + 4G_{xy}^2 - 2G_{xx}G_{yy} + G_{yy}^2 \quad (10)$$

Figure 12:
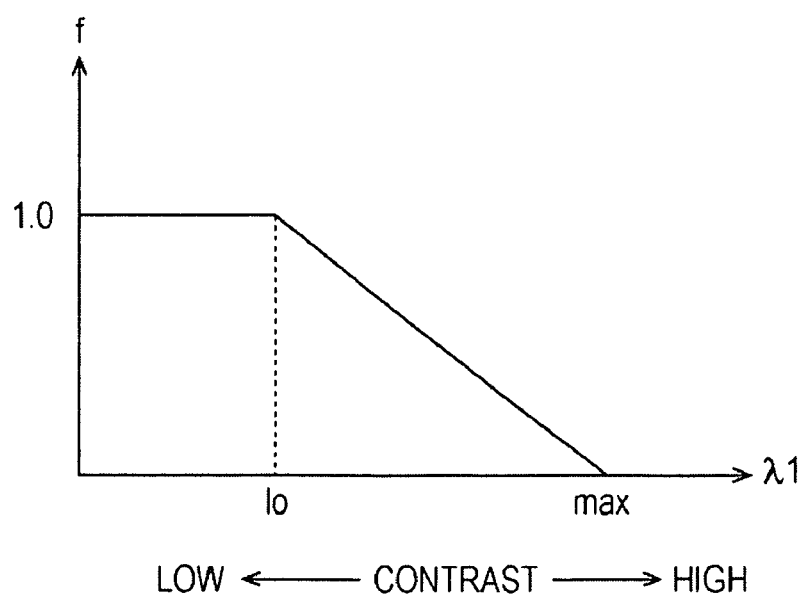
FIG. 12 is a schematic diagram provided to describe the operation of a degree-of-texture calculation unit in FIG. 7.

A degree-of-texture calculation unit 26 calculates, as shown in FIG. 12, a parameter f of contrast whose value increases as the value of the eigenvalue λ1 in the edge gradient direction v1 becomes smaller due to characteristics that saturate at the value 1. Here, when the value of the eigenvalue λ1 in this edge gradient direction v1 is large, it means that the gradient of this pixel value is large in a direction in which the gradient of the pixel value is largest. Thus, it can be said that the target pixel is a portion with a strong contrast. Therefore, it can be said that the probability of this target pixel being a portion relating to a detailed structure, such as grasses, flowers, the leaves of trees, or the surface of rocks, is low, and it can be said that the degree of texture is low. Therefore, in this case, the degree-of-texture calculation unit 26 calculates the parameter f of contrast so that the value thereof approaches from the value 1 to the value 0 as this eigenvalue λ1 increases.

Figure 13:
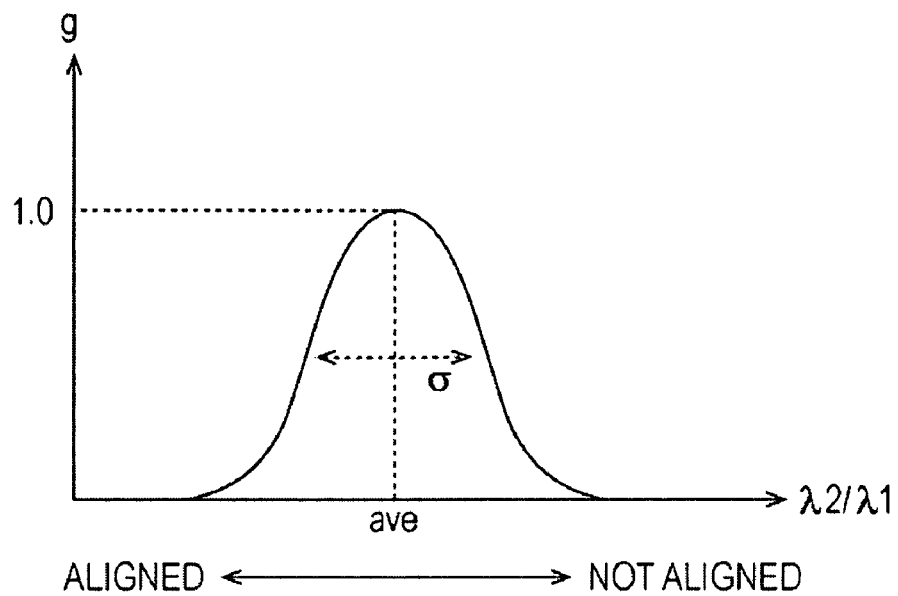
FIG. 13 is a schematic diagram provided to give a description continued from FIG. 12.

Also, the degree-of-texture calculation unit 26 divides, as shown in FIG. 13, the eigenvalue λ2 in the direction v2 perpendicular to the edge gradient direction v1 by the eigenvalue λ1 in the edge gradient direction v1, thereby calculating the quotient value λ2/λ1. The degree-of-texture calculation unit 26 generates a parameter g of the degree of edge alignment so that this quotient value λ2/λ1 becomes a peak value having the value 1 at a predetermined value ave and, as the quotient value λ2/λ1 moves away from this predetermined value ave, the value of the quotient value λ2/λ1 decreases.

Here, when the target pixel is an edge, the more the directions are aligned, the smaller this quotient value λ2/λ1 becomes. Also, conversely, the value increases when there are more noise components and the edges intersect. Accordingly, when the value of the quotient value λ2/λ1 is significantly small or significantly large, it can be said that the probability of this target pixel being a portion relating to a detailed structure, such as grasses, flowers, the leaves of trees, or the surface of rocks, is low, and it can be said that the degree of texture is low. Therefore, the degree-of-texture calculation unit 26 calculates, based on the quotient value λ2/λ1, the parameter g of the degree of edge alignment so that the value thereof approaches from the value 0 to the value 1 as the probability of being a portion relating to a detailed structure increases.

The degree-of-texture calculation unit 26 multiplies these two parameters f and g and outputs a degree of texture texness.

A tiling unit 27 processes, as in the tiling unit 7, this degree of texture texness and outputs a degree of texture texness$_{tiling}$ corresponding to the subtle texture component S5 output froth the tiling unit 7. Note that in this case, an image gradient unit and a texture calculation unit may be additionally provided, and, using this image gradient unit and this texture calculation unit, the subtle texture component S5 output from the tiling unit 7 or the subtle texture component S6 output from the unevenness reducing unit 8 may be processed to obtain a degree of texture texness$_{tiling}$.

A tiling unit 28 processes, as in the tiling unit 7, the eigenvalues λ1 and λ2 output from the gradient analysis unit 25 and calculates eigenvalues λ1t and λ2t corresponding to the subtle texture component S5 output from the tiling unit 7. Note that in this case, as has been described above with regard to the tiling unit 27, an image gradient unit may be additionally provided, and the subtle texture component S5 output from the tiling unit 7 or the subtle texture component S6 output from the unevenness reducing unit 8 may be processed to obtain eigenvalues λ1t and λ2t corresponding to the subtle texture component S5.

Figure 14:
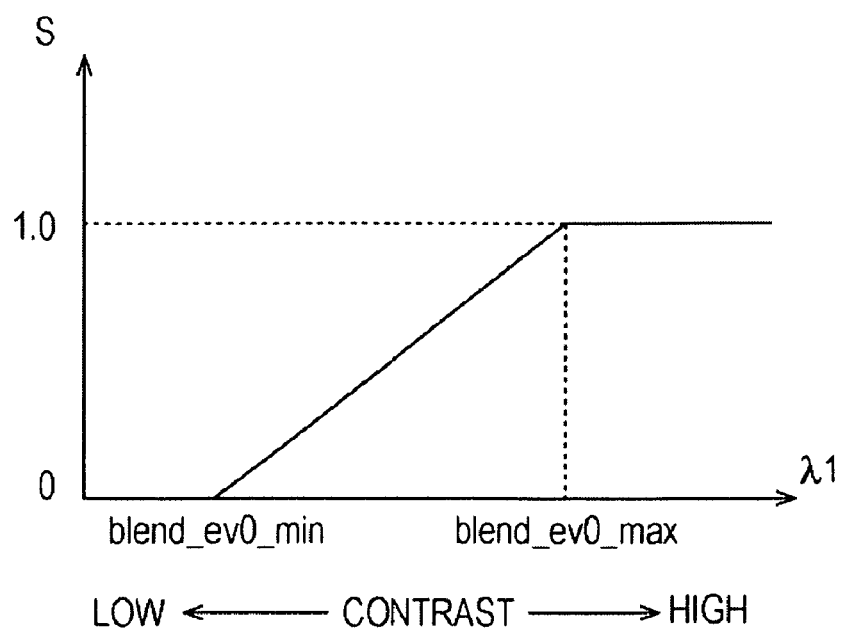
FIG. 14 is a schematic diagram provided to describe the operation of an edge analysis unit in FIG. 7.
Figure 15:
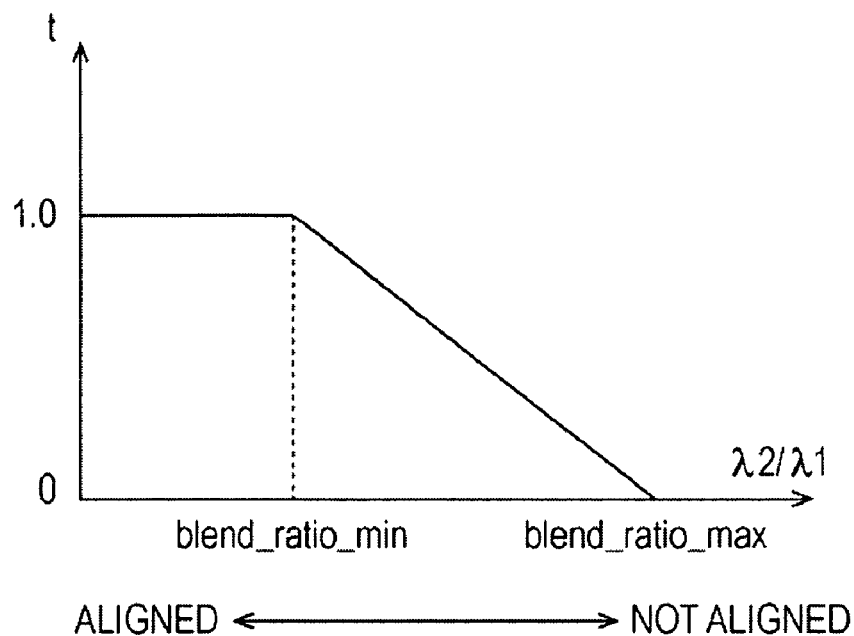
FIG. 15 is a schematic diagram provided to give a description continued from FIG. 14.

An edge analysis unit 29 processes these λ1, λ2, λ1t, and λ2t to generate an edge-based weighting coefficient α$_{type-\epsilon}$ whose value decreases as the probability of being an edge increases. That is, the edge analysis unit 29 generates, as shown in FIG. 14, a parameter S within the range from the value 1 to the value 0 on the basis of the eigenvalue λ1, in which the value of the parameter S increases as the contrast increases in the edge gradient direction v1 and the probability of being an edge increases. Also, as shown in FIG. 15, the edge analysis unit 29 generates, on the basis of the quotient value λ2/λ1 of the eigenvalues λ2 and λ1, a parameter t whose value increases as the luminance gradient becomes aligned and the probability of being an edge increases. The edge analysis unit 29 multiplies the parameters S and t generated from these eigenvalues λ1 and λ2 to generate a parameter edgeness indicating the edgeness of the target pixel in the input video signal S1.

Further, the edge analysis unit 29 similarly processes the eigenvalues λ1t and λ2t corresponding to the subtle texture component S5 to generate a parameter edgeness$_{tile}$ indicating the edgeness of the target pixel in the subtle texture component S5.

The edge analysis unit 29 processes these two parameters edgeness and edgeness$_{tile}$ by performing arithmetic processing of the following equation to generate an edge-based weighting coefficient α$_{type-E}$ so that the component amount of the subtle texture component S3 of the video signal S9 decreases in a portion such as an edge:
[Eq. 11]
$$\alpha_{type-E} = 1.0 - \max(\text{edgeness}, \text{edgeness}_{tile}) \quad (11)$$

An activity calculation unit 30 processes the input video signal S1 by performing arithmetic processing of the following equations to calculate the absolute value of a difference act(x, y) with respect to nearby pixels. Note that, in here, d(x, y) is a pixel value of a target pixel at the position (x, y). Also, d(x+1, y) and d(x, y+1) are pixel values of adjacent pixels in the horizontal direction and the vertical direction.
[Eq. 12]
$$h_{act}(x,y) = |d(x,y) - d(x+1,y)|$$

$$v_{act}(x,y) = |d(x,y) - d(x,y+1)|$$

$$\text{act}(x,y) = h_{act} + v_{act} \quad (12)$$

For each target pixel, the activity calculation unit 30 sets a region with m pixels and n pixels in the horizontal direction and the vertical direction surrounding the target pixel and processes this absolute value of the difference act(x, y) by performing arithmetic processing of the following equations, thereby calculating an activity act$_{blk\_raw}$ and a normalized activity $act_{blk\_norm}$ obtained by normalizing this activity $act_{blk\_raw}$ with a difference value $act_{max}-act_{min}$ between a maximum value $act_{max}$ and a minimum value $act_{min}$ within the region. Note that the range of Σ is this region with m pixels and n pixels.

[Eq. 13]

$$act_{blk\_raw}(x, y) = \sum_m \sum_n act(x+m, y+n)$$

$$act_{blk\_norm}(x, y) = \frac{1}{act_{max} - act_{min}} \times act_{blk\_raw}(x, y)$$

(13)

A tiling unit 31 processes, as in the tiling unit 7, the activity $act_{blk\_raw}$ obtained by the activity calculation unit 30 and calculates an activity $act_{tile\_raw}$ corresponding to the subtle texture component S5 output from the tiling unit 7. Note that, in this case, as has been described above with regard to the tiling unit 27, an image gradient unit and an activity calculation unit may be additionally provided, and the subtle texture component S5 output from the tiling unit 7 or the subtle texture component S6 output from the unevenness reducing unit 8 may be processed to calculate an activity $act_{tile\_raw}$.

Figure 16:
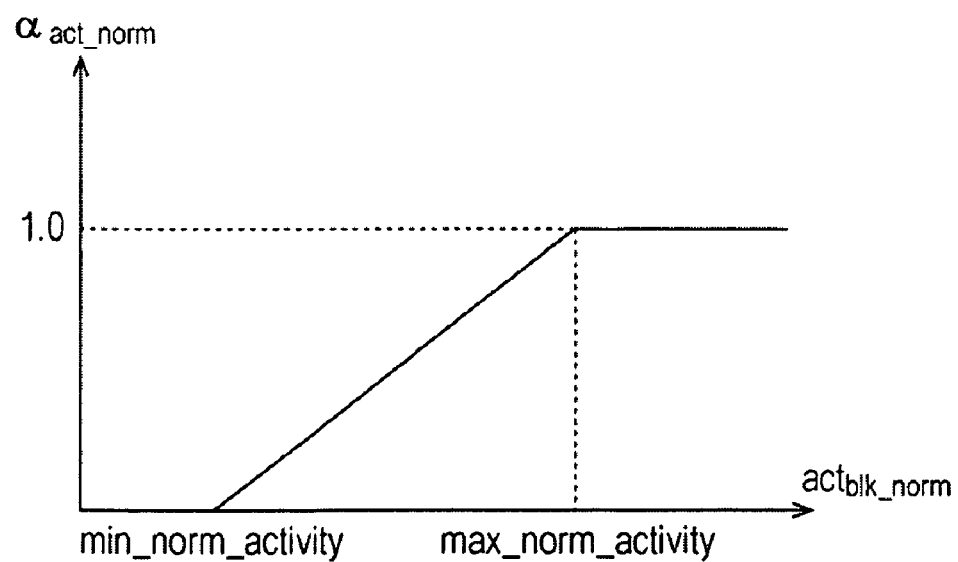
FIG. 16 is a schematic diagram provided to describe the operation of an activity analysis unit in FIG. 7.

An activity analysis unit 32 receives the normalized activity $act_{blk\_norm}$ obtained by the activity calculation unit 30 and, as shown in FIG. 16, generates, within the range from the value 1 to the value 0, a parameter $\alpha_{act\_norm}$ whose value increases in accordance with an increase in the value of the normalized activity $act_{blk\_norm}$. Accordingly, the activity analysis unit 32 generates the parameter $\alpha_{act norm}$ whose value increases as the activity increases.

Figure 17:
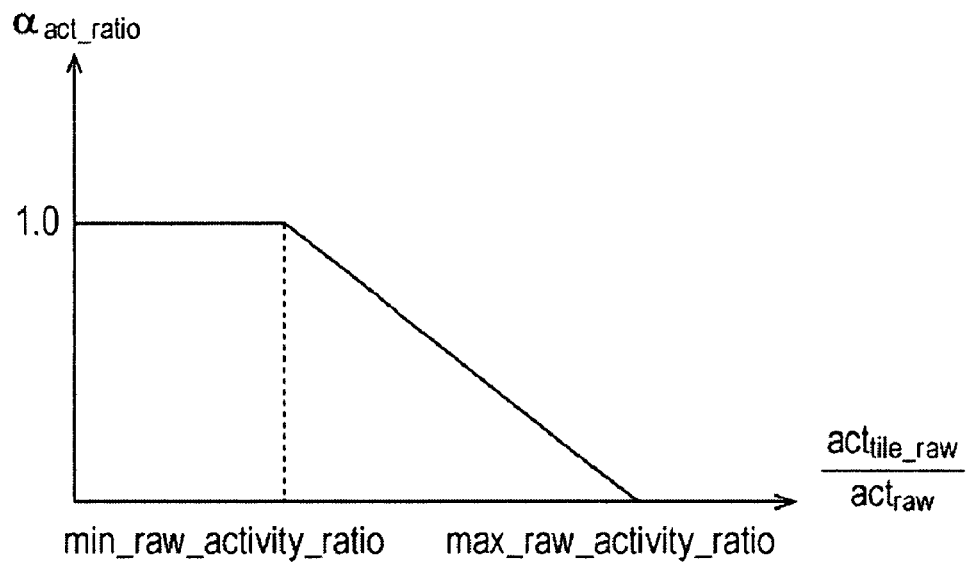
FIG. 17 is a schematic diagram provided to give a description continued from FIG. 16.

Further, the activity analysis unit 32 divides the activity $act_{tile\_raw}$ by the activity $act_{blk\_raw}$ to generate, as shown in FIG. 17, within the range from the value 1 to the value 0, a parameter $\alpha_{act\_ratio}$ whose value decreases as the quotient value increases. Here, this quotient value increases in value when an edge, an isolated point, or the like exists in the region where the activity is detected. In contrast, when such an edge, an isolated point, or the like does not exist and when changes in pixel values within the region are uniform, this quotient value becomes a value less than the value 1 according to a frequency component relating to these changes in pixel values. Accordingly, the activity analysis unit 32 generates the parameter $\alpha_{act\_ratio}$ whose value decreases as the probability of an edge, an isolated point, or the like existing in the surroundings increases.

The activity analysis unit 32 multiplies the two parameters $\alpha_{act\_norm}$ and $\alpha_{act\_ratio}$ calculated in this manner and thus outputs an activity-based weighting coefficient $\alpha_{activity}$ so that the proportion of the subtle texture component S3 of the video signal S9 increases in a portion where changes in pixel values are constant.

By performing arithmetic processing of the following equation, an activity-ratio calculation unit 33 divides the activity $act_{tile\_raw}$ of the target pixel by an average value of activities $act_{tile\_raw}$ of the individual pixels in the basic block to calculate an activity $ratio_{pix\_vs\_blk}$:

[Eq. 14]

$$ratio_{pix\_vs\_blk} = \frac{\text{activity of target pixel}}{\text{average of activities in block}}$$

(14)

Figure 18:
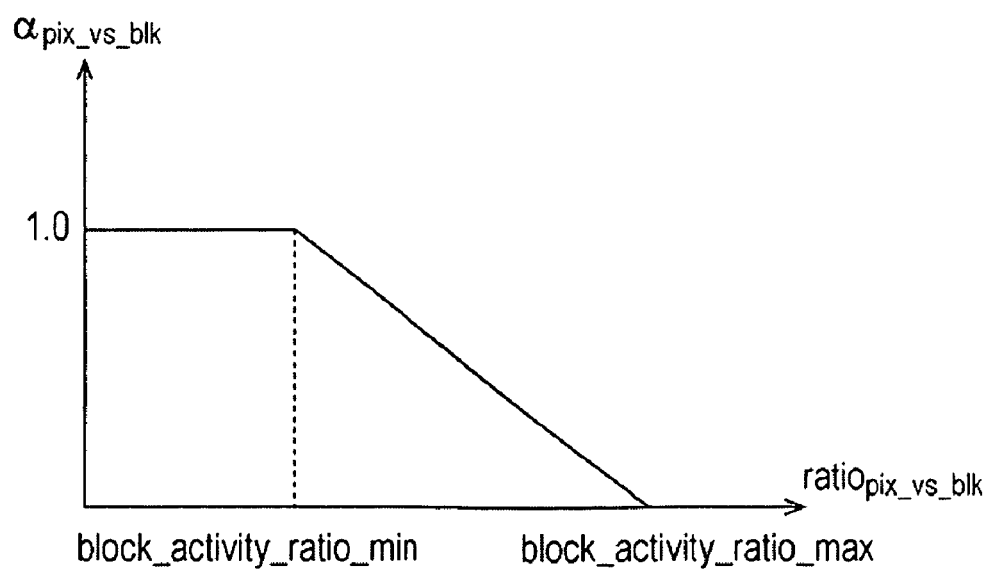
FIG. 18 is a schematic diagram provided to describe the operation of an activity-ratio analysis unit in FIG. 7.

An activity-ratio analysis unit 34 receives this activity $ratio_{pix\_vs\_blk}$ and, as shown in FIG. 18, generates, within the range from the value 1 to the value 0, a weighting coefficient $\alpha_{pix\_vs\_blk}$ whose value decreases as this $ratio_{pix\_vs\_blk}$ increases. Here, this $ratio_{pix\_vs\_blk}$ increases in value when a heterogeneous texture component exists in the basic block. Specifically, this case corresponds to the case where, for example, there is a mixture of a portion relating to a detailed structure of grasses and flowers and a portion relating to a detailed structure of rocks or the like. Accordingly, the activity-ratio analysis unit 34 generates the weighting coefficient $\alpha_{pix\_vs\_blk}$ whose value decreases as the probability of existence of a heterogeneous texture component increases, and generates the weighting coefficient $\alpha_{pix\_vs\_blk}$ so that the proportion of the subtle texture component of the video signal S9 increases in a portion where changes in pixel values are constant.

By performing arithmetic processing of the following equation, a multiplication circuit 35 multiplies the weighting coefficients $\alpha_{type-E}$, $\alpha_{activity}$, and $\alpha_{pix\_vs\_blk}$ obtained by the edge analysis unit 29, the activity analysis unit 32, and the activity-ratio analysis unit 34 to obtain a blend ratio α:

[Eq. 15]

$$\alpha = \alpha_{type-e} \times \alpha_{activity} \times \alpha_{pix\_vs\_blk}$$

(15)

(2) Operation of Embodiment

In the foregoing structure, high frequency components are extracted from the input video signal S1 (FIG. 1) in the texture extraction unit 3, thereby extracting texture components which are detailed structure components of grasses, flowers, the leaves of trees, the surface of rocks, and the like. The high frequency components extracted in this manner here change subtly in a natural image even in portions where the color and the luminance are substantially uniform, such as a background and a foreground. Because of these subtle changes, the textures of details, such as grasses, flowers, the leaves of trees, and the surface of rocks, are represented in the natural image.

Therefore, when these texture components are deteriorated, the details such as grasses, flowers, the leaves of trees, and the surface of rocks lack textures. In order to improve these textures, although the textures can be improved to a certain degree by enhancing high frequency components, if frequency components relating to these detailed structures such as grasses, flowers, the leaves of trees, and the surface of rocks themselves are lacking, only the noise amount increases, and the textures cannot be improved at all.

In particular, when, for example, a video signal based on the SDTV system is format-converted to a video signal based on the HDTV system by performing scaling, high frequency components relating to these textures are relatively lacking due to an increase in resolution. Thus, the textures are significantly damaged.

Therefore, in this embodiment, in the subtle texture generation unit 6 (FIG. 2 and FIG. 3), this texture component S4 is reduced in increments of the block BLA to generate the basic block BBL. Also, this basic block BBL is repeatedly pasted to the original block BL to generate the subtle texture component S5 in which the spatial frequency is increased compared with the original texture component S4. Also, this subtle texture component S5 is processed by the unevenness reducing unit 8, the texture combining unit 15, and the like to generate the subtle texture component S3. Image combination of this subtle texture component S3 with the original input video signal S1 is performed. Accordingly, in this video signal processing apparatus 1, even when frequency components relating to detailed structures, such as grasses, flowers, the leaves of trees, and the surface of rocks, themselves are lacking, the spatial frequencies of high frequency components can be increased so as to compensate for these lacking components. This can improve the textures of the details.

However, when the textures of details are to be improved by repeating the basic block BBL in this manner, edge components and the like other than detailed structures such as grasses, flowers, and the leaves of trees are to be similarly processed. This gives rise to the occurrence of various inconveniences.

Therefore, in this video signal processing apparatus 1, the image combining ratio between the input video signal S1 and the subtle texture component S3 is controlled by the texture-added-amount control unit 16. Accordingly, inconvenient processing in edges and the like is avoided, thereby improving textures.

More specifically, in this video signal processing apparatus 1, when a subtle texture component is to be generated in the tiling unit 7 (FIG. 3), the central portion BLA of the block BL is selectively reduced to generate the basic block BBL. That is, it is found out that, when the block BL is simply reduced to generate the basic block BBL, unnaturalness occurs due to repetition of the block BBL; in contrast, when the central portion BLA of the block BL is selectively reduced to generate the basic block BBL in this manner, the impression can be made closer to that of a natural image. Accordingly, in this video signal processing apparatus 1, textures can be improved to be closer to a natural impression.

Also, this central portion BLA is set to change in size according to the degree of evenness or the like. Here, after all, this change in size corresponds to a change in reduction ratio used to generate the basic block BBL. This is to change the spatial frequency to be increased in a subtle texture component. Accordingly, the spatial frequency can be sufficiently increased by changing the size of this central portion BLA according to the degree of evenness, thereby enhancing high frequencies. This can also improve textures to be closer to a natural impression.

Figure 3:
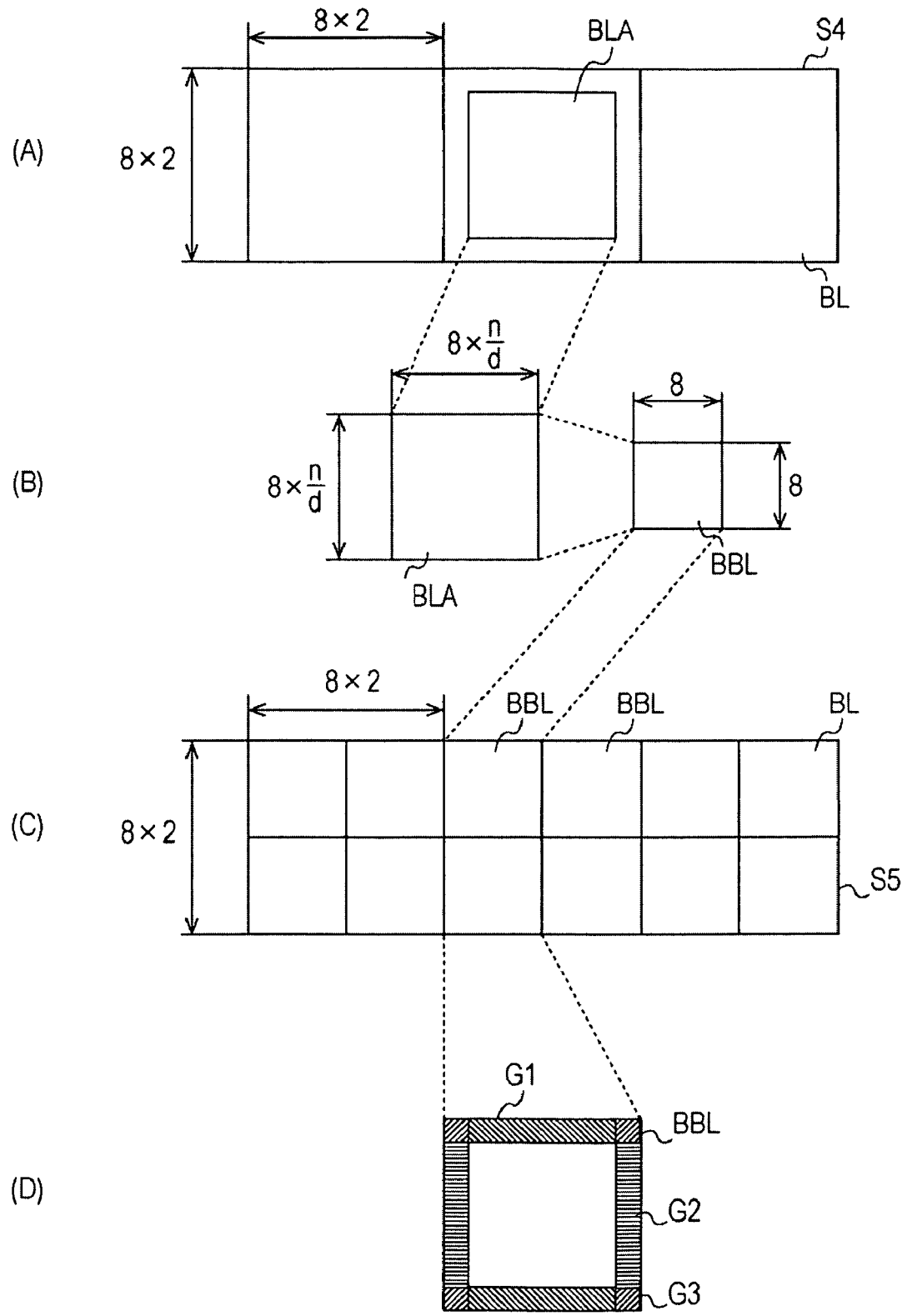
FIG. 3 includes schematic diagrams provided to describe the operation of a tiling unit in FIG. 2.

Also, in the unevenness reducing unit 8, a filtering process is performed on the subtle texture component S5 generated by this tiling unit 7, thereby suppressing unevenness between basic blocks BBL of subtle texture components S5. Accordingly, in this video signal processing apparatus 1, periodic components relating to repetition of the basic block BBL can be made unnoticeable, and unnaturalness due to these periodic components can be effectively avoided. In this processing, the unevenness reducing unit 8 suppresses unevenness by performing a filtering process only on pixels adjacent to the boundary of the basic block BBL. This prevents reduction in high frequency components as much as possible and suppresses unevenness (FIG. 3).

Also, in the difference diffusion unit 9 thereafter, the difference err with respect to the original texture component S4 is diffused into peripheral pixels of the target pixel. Accordingly, the subtle texture component S7 is generated by increasing the spatial frequency by repeating the basic block BBL and correcting the pixel value so that the pixel value does not become greatly different from the original texture component S4. Accordingly, in the case of the subtle texture component S7 in which this difference has been diffused, even when the subtle texture component S7 has been generated by repeating the basic block BBL in this manner, the subtle texture component S7 has a pixel value changing tendency of the original texture component S4. This can also avoid unnaturalness and improve textures to be closer to a natural impression.

In this video signal processing apparatus 1, the subtle texture component S7 in which this difference has been diffused and the original subtle texture component S6 are combined by the texture combining unit 15. In this combining process, the combining ratio is changed according to the degrees of texture texness and texness$_{tiling}$. Accordingly, these subtle texture components S6 and S7 are combined so that the original subtle texture component S6 increases in detailed structure portions, such as grasses, flowers, and the leaves of trees, and the subtle texture component S7 in which the difference has been diffused increases in portions such as edges, whereby textures can be improved without being unnatural.

Also, gain is changed using the fluctuating gain $g_{fluct}$ so that changes in pixel values in a sequence of basic blocks can be made closer to changes in pixel values in a natural image. This can also improve textures without being unnatural.

In contrast, in the texture-added-amount control unit 16 (FIG. 7), in the input video signal S1, the edge gradient direction v1 in which the gradient of the pixel value is largest and the edge direction v2 perpendicular to this edge gradient direction v1 are detected in the gradient analysis unit 25. For these gradient directions v1 and v2, eigenvalues $\lambda 1$ and $\lambda 2$ indicating diffusion of the gradient of the pixel value are detected, respectively (FIG. 10 and FIG. 11). Also, these eigenvalues $\lambda 1$ and $\lambda 2$ are processed by the tiling unit 28, thereby obtaining eigenvalues $\lambda 1t$ and $\lambda 2t$ corresponding to the subtle texture component S5 output from the tiling unit 7. Accordingly, the parameters $\lambda 1$, $\lambda 2$, $\lambda 1t$, and $\lambda 2t$ indicating the edgeness on a pixel-by-pixel basis are detected in the input video signal S1.

Regarding the input video signal S1, among these parameters $\lambda 1$, $\lambda 2$, $\lambda 1t$, and $\lambda 2t$, the parameters $\lambda 1$ and $\lambda 2$ are sequentially processed by the degree-of-texture calculation unit 26 and the tiling unit 27 (FIG. 12 and FIG. 13), thereby obtaining degrees of texture texness and texness$_{tiling}$.

Also, the parameters $\lambda 1$, $\lambda 2$, $\lambda 1t$, and $\lambda 2t$ are processed in the edge analysis unit 29 (FIG. 14 and FIG. 15), thereby generating a weighting coefficient $\alpha_{type-E}$ so that the proportion of the subtle texture component S3 decreases in an edge portion. Based on this weighting coefficient $\alpha_{type-E}$, the combining ratio between the subtle texture component S3 and the input video signal S1 in the blending unit 17 is set. Accordingly, in this video signal processing apparatus 1, the proportion of the input video signal S1 is increased in an edge portion, and accordingly, in a portion such as an edge, it becomes possible not to enhance a high frequency component by repeating a basic block. Accordingly, deterioration of the image quality can be effectively avoided, and textures can be improved.

Also, an activity of the input video signal S1 is obtained in the activity calculation unit 30. This activity is processed by the tiling unit 31, thereby obtaining an activity corresponding to the subtle texture component S5 output from the tiling unit 7. Regarding the input video signal, these activities are processed by the activity analysis unit 32 (FIG. 16 and FIG. 17), thereby generating an activity-based weighting coefficient $\alpha_{activity}$ so that the proportion of the subtle texture component S3 increases in a portion where changes in pixel values are constant. Based on this weighting coefficient $\alpha_{activity}$, the combining ratio between the subtle texture component S3 and the input video signal S1 in the blending unit 17 is set. Accordingly, in this embodiment, it becomes possible not to enhance a high frequency component by repeating a basic block in an edge, an isolated point, or the like. Accordingly, deterioration of the image quality can be effectively avoided, and textures can be improved.

Also, regarding the input video signal S1, the ratio between the activity of the input video signal S1 and the activity corresponding to the subtle texture component S5 is obtained in the activity-ratio calculation unit 33. Thereafter, a weighting coefficient $\alpha_{pix\ vs\ blk}$ is generated in the activity-ratio analysis unit 34 on the basis of this ratio so that the proportion of the subtle texture component increases in a portion where changes in pixel values are constant (FIG. 18). Based on this weighting coefficient $\alpha_{pix\ vs\ blk}$, the combining ratio between the subtle texture component S3 and the input video signal S1 in the blending unit 17 is set. Accordingly, in this embodiment, it becomes possible not to enhance a high frequency component by repeating a basic block when a heterogeneous texture component exits in the basic block. Accordingly, deterioration of the image quality can be effectively avoided, and textures can be improved.

Based on these weighting coefficients $\alpha_{type-E}$, $\alpha_{activity}$, and $\alpha_{pix\ vs\ blk}$, image combination of the input video signal S1 is performed with the subtle texture component S3 in the blending unit 17, thereby generating a video signal S9. Here, even when the combining ratio is changed by detecting various parameters in this manner and the technique of generating the subtle texture component S3 is further revised, pixels whose luminance levels are significantly increased are distributed in a point-like manner in the video signal S9 output from this blending unit 17. Because of this, deterioration of the image quality is perceived.

Therefore, in the video signal processing apparatus 1, a pixel whose luminance value has risen compared with nearby pixels is detected in the peak detection unit 18 thereafter. Further, on the basis of this detection result, the rising of the luminance value is suppressed in the peak suppression unit 19 thereafter. Accordingly, in this video signal processing apparatus 1, a point-like distribution of pixels whose luminance levels are significantly increased is prevented, and deterioration of the image quality is prevented.

(1) Advantageous Effects of Embodiment

According to the foregoing structure, the textures of details can be improved, compared with the past, by extracting a high frequency component from an input image, reducing the high frequency component to generate a subtle texture component, and performing image combination of this subtle texture component and the input image.

Also, when extracting and reducing a high frequency component, a central portion of a block is selectively reduced to generate a basic block. Accordingly, a subtle texture component which is closer to a natural image can be generated. This can improve textures to be closer to a natural impression.

Also, with a filtering process, unevenness between basic blocks of subtle texture components is suppressed. Accordingly, unnaturalness due to periodic components in the basic blocks can be effectively avoided.

Also, by diffusing the difference value of the subtle texture component with respect to the high frequency component into peripheral pixels, a change in pixel value of the original texture component can be reflected in the subtle texture component. This can also avoid unnaturalness and improve textures to be closer to a natural impression.

Also, by combining and processing the subtle texture component in which this difference has been diffused and the original subtle texture component, with control of the combining ratio, these subtle texture components can be combined so that the original subtle texture component increases in a detailed structure portion, such as grasses, flowers, or the leaves of trees, and the subtle texture component in which the difference has been diffused increases in a portion such as an edge. Accordingly, textures can be improved without being unnatural.

Specifically, textures can be improved without being unnatural by changing the combining ratio according to the degree of texture indicating the probability of being a texture.

Also, by changing the gain and correcting the subtle texture component based on this gain, a change in pixel value can be made closer to a change in pixel value of a natural image. This can also improve textures without being unnatural.

Also, by detecting a parameter indicating the edgeness of a target pixel in an input image and setting an image combining ratio so that the proportion of a subtle texture component decreases in an edge portion, it becomes possible not to enhance a high frequency component by repeating a basic block in a portion such as an edge. Accordingly, deterioration of the image quality can be effectively avoided, and textures can be improved.

Also, by detecting an activity of an input image and setting an image combining ratio so that the proportion of a subtle texture component increases in a portion where changes in pixel values are constant, it becomes possible not to enhance a high frequency component by repeating a basic block in an edge, an isolated point, or the like. Accordingly, deterioration of the image quality can be effectively avoided, and textures can be improved.

Also, by calculating the ratio between an activity of an input image and an activity of a subtle texture component and setting, based on this ratio, an image combining ratio so that the proportion of the subtle texture component increases in a portion where changes in pixel values are constant, it becomes possible not to enhance a high frequency component by repeating a basic block in the case where a heterogeneous texture component exists. Accordingly, deterioration of the image quality can be effectively avoided, and textures can be improved.

Also, by suppressing the peak of a luminance value in an output image, a point-like distribution of pixels whose luminance levels are significantly increased can be prevented, and hence, deterioration of the image quality can be prevented.

Embodiment 2

Note that, in the above-described embodiment, the case in which a texture component is extracted by simply extracting a high frequency component from an input video signal has been described. However, the present invention is not limited thereto. Various techniques are widely applicable to the technique of extracting a texture component, such as the case where characteristics of a filter that extracts a high frequency component are dynamically changed, and a texture component is extracted.

That is, a detailed structure component in a uniform portion of a background, a foreground, or the like, such as grasses, flowers, the leaves of trees, or the surface of rocks, becomes, for example, a high frequency component with a significantly high frequency in a zoomed out video image. Conversely, in a zoomed in video image, the detailed structure component is distributed even in a low frequency band. Accordingly, for example, in a relatively even portion where changes in pixel values are small, a texture component can be extracted by extracting even a low frequency component. In contrast, in a portion where changes in pixel values are large, a texture component can be extracted by extracting a component in a high frequency band.

Accordingly, textures can be improved even more by dynamically changing characteristics of a filter and extracting a texture component. For example, this corresponds to the case where a texture component is extracted by performing a frequency analysis in each portion of an input video image signal and switching in each portion the cut-off frequency of the filter according to a frequency spectrum distribution, or the case where a texture component is extracted by determining the attribute of each portion based on hue, luminance value, degree of evenness, or the like, and switching in each portion the cut-off frequency of the filter on the basis of this attribute.

Also in the above-described embodiment, the case in which an input image serving as a moving image is processed by processing an input video signal has been described. However, the present invention is not limited thereto. The present invention is widely applicable to the case in which a still image is processed.

Also in the above-described embodiment, the case in which the present invention is applied to a display apparatus has been described. However, the present invention is not limited thereto. The present invention is widely applicable to a recording/reproducing apparatus, a processing apparatus, an editing apparatus, a processing program, and the like for various video image signals.

Industrial Applicability

The present invention is applicable to, for example, a video image apparatus such as a display apparatus.

The invention claimed is:

1. An image processing apparatus characterized by comprising:
   a texture extraction unit that extracts a texture component from an input image;
   a subtle texture generation unit that generates, for each of blocks formed by dividing the input image, a basic block by reducing a block constituted of the texture component and repeatedly arranges the basic block in the block, thereby generating a subtle texture component in which a spatial frequency of the texture component has been increased;
   a blending unit, that performs image combination of the subtle texture component and the input image; and
   a texture-added-amount control unit that sets an image combining ratio in the blending unit.

2. An image processing method characterized by comprising:
   a texture extraction step of extracting a texture component from an input image;
   a subtle texture generation step of generating, for each of blocks formed by dividing the input image, a basic block by reducing a block constituted of the texture component and repeatedly arranging the basic block in the block, thereby generating a subtle texture component in which a spatial frequency of the texture component has been increased;
   a blending step of performing image combination of the subtle texture component and the input image to generate an output image; and
   a texture-added-amount control step of setting an image combining ratio in the blending step.

3. The image processing method according to claim 2, characterized in that the subtle texture generation step generates the basic block by selectively reducing a central portion of the block.

4. The image processing method according to claim 2, characterized in that the subtle texture generation step includes:
   an unevenness suppression step of suppressing unevenness between the basic blocks in the subtle texture components by performing a filtering process of the subtle texture components.

5. The image processing method according to claim 2, characterized in that the subtle texture generation step includes:
   a difference diffusion step of diffusing a difference value of the subtle texture component with respect to the texture component into peripheral pixels.

6. The image processing method according to claim 2, characterized in that the subtle texture generation step includes:
   a difference diffusion step of diffusing a difference value of the subtle texture component with respect to the texture component into peripheral pixels; and
   a combining step of combining the subtle texture component in which the difference has been diffused in the difference diffusion step with the subtle texture component,
   wherein the subtle texture component processed in the blending step is the subtle texture component synthesized in the combining step, 7. The image processing method according to claim 6, characterized in that the combining step changes a combining ratio according to a degree of texture indicating probability of being a texture.

8. The image processing method according to claim 2, characterized in that the subtle texture generation step multiplies the subtle texture component by a fluctuating gain and outputs a product.

9. The image processing method according to claim 2, characterized in that the texture-added-amount control step includes:
   an edge detection step of detecting a parameter indicating edgeness of a target pixel in the input image; and
   an edge analysis step of analyzing the parameter detected in the edge detection step and setting the image combining ratio so that a proportion of the subtle texture component decreases in an edge portion.

10. The image processing method according to claim 2, characterized in that the texture-added-amount control step includes:
    an activity detection step of detecting an activity of the input image; and
    an activity analysis step of analyzing the activity and setting the image combining ratio so that a proportion of the subtle texture component increases in a portion where changes in pixel values are constant.

11. The image processing method according to claim 2, characterized in that the texture-added-amount control step includes:
    an activity detection step of detecting an activity of the input image; and
    a subtle-texture-component activity detection step of detecting an activity of the subtle texture component;
    an activity-ratio calculation step of calculating a ratio between the activity of the input image and the activity of the subtle texture component; and
    an activity-ratio analysis step of setting, based on the ratio, the image combining ratio so that a proportion of the subtle texture component increases in a portion where changes in the pixel values are constant.

12. The image processing method according to claim 2, characterized by comprising;
    a peak suppression step of suppressing a peak of a pixel value in the output image.

13. A non-transitory computer readable storage medium having a program that when executed by a computer performs an image processing method
    comprising:
    a texture extraction step of extracting a texture component from an input image;

a subtle texture generation step of generating, for each of blocks formed by dividing the input image, a basic block by reducing a block constituted of the texture component and repeatedly arranging the basic block in the block, thereby generating a subtle texture component in which a spatial frequency of the texture component has been increased;

a blending step of performing image combination of the subtle texture component and the input image to generate an output image; and a texture-added-amount control step of setting an image combining ratio in the blending step.

14. The storage medium of claim 13 wherein the subtle texture generation step generates the basic block by selectively reducing a central portion of the block.

15. The storage medium of claim 13 wherein the subtle texture generation step includes an unevenness suppression step of suppressing unevenness between the basic blocks in the subtle texture components by performing a filtering process of the subtle texture components.

16. The storage medium of claim 13 wherein the subtle texture generation step includes a difference diffusion step of diffusing a difference value of the subtle texture component with respect to the texture component into peripheral pixels.

17. The storage medium of claim 13 wherein the subtle texture generation step includes:

a difference diffusion step of diffusing a difference value of the subtle texture component with respect to the texture component into peripheral pixels; and a combining step of combining the subtle texture component in which the difference has been diffused in the difference diffusion step with the subtle texture component, wherein the subtle texture component processed in the blending step is the subtle texture component synthesized in the combining step.

18. The storage medium of claim 17, characterized in that the combining step changes a combining ratio according to a degree of texture indicating probability of being a texture.

19. The storage medium of claim 13 wherein the subtle texture generation step multiplies the subtle texture component by a fluctuating gain and outputs a product.

20. The storage medium of claim 13 wherein the texture-added-amount control step includes:

an edge detection step of detecting a parameter indicating edgeness of a target pixel in the input image; and an edge analysis step of analyzing the parameter detected in the edge detection step and setting the image combining ratio so that a proportion of the subtle texture component decreases in an edge portion.

21. The storage medium of claim 13 wherein the texture-added-amount control step includes:

an activity detection step of detecting an activity of the input image; and an activity analysis step of analyzing the activity and setting the image combining ratio so that a proportion of the subtle texture component increases in a portion where changes in pixel values are constant.

22. The storage medium of claim 13 wherein the texture-added-amount control step includes:

an activity detection step of detecting an activity of the input image; and a subtle-texture-component activity detection step of detecting an activity of the subtle texture component;

an activity-ratio calculation step of calculating a ratio between the activity of the input image and the activity of the subtle texture component; and an activity-ratio analysis step of setting, based on the ratio, the image combining ratio so that a proportion of the subtle texture component increases in a portion where changes in the pixel values are constant.

23. The storage medium of claim 13 wherein the image processing method includes a peak suppression step of suppressing a peak of a pixel value in the output image.

* * * * *